United States Patent [19]

Bauer et al.

[11] Patent Number: 4,559,663
[45] Date of Patent: Dec. 24, 1985

[54] WINDSHIELD WIPER-ARM ASSEMBLY

[75] Inventors: Kurt Bauer, Ingersheim; Reinhard Edele, Bietigheim-Bissingen; Anton Epple, Rottenburg; Hans Trube, Herrenberg; Martin Pfeiffer, Stuttgart; Josef Berger, Wolfschlugen, all of Fed. Rep. of Germany

[73] Assignees: SWF Auto-Electric GmbH, Bietgheim-Bissingen; Daimler-Benz, Stuttgart, both of Fed. Rep. of Germany

[21] Appl. No.: 646,383

[22] Filed: Aug. 31, 1984

[30] Foreign Application Priority Data

Aug. 31, 1983 [DE] Fed. Rep. of Germany ....... 3331311

[51] Int. Cl.4 ............................................. B60S 1/34
[52] U.S. Cl. .............................. 15/250.35; 15/250.34; 15/250.42
[58] Field of Search ........... 15/250.16, 260.17, 250.19, 15/250.20, 250.34, 250.35, 250.42

[56] References Cited

U.S. PATENT DOCUMENTS

| 2,790,990 | 5/1957 | Wallis | 15/250.34 |
| 2,997,727 | 8/1961 | Ziegler | 15/250.35 |
| 3,548,442 | 12/1970 | Stratton | 15/250.34 |
| 4,347,642 | 9/1982 | Bauer et al. | 15/250.35 |
| 4,497,084 | 2/1985 | Auzolat | 15/250.34 |

Primary Examiner—Peter Feldman
Attorney, Agent, or Firm—Donald J. Lenkszus

[57] ABSTRACT

A low overall height is provided in a wiper-arm assembly with a wiper arm which has a fastening part, a link part which is swivelably linked to the fastening part and two side walls and a back connecting the two side walls, and a contact pressure spring which is accommodated in the link part and acts on the link part and the fastening part, and also with a wiper blade linked to the wiper arm, which blade lies at least partly in line with the link part. The low height is achieved by making the clearance between the contact pressure spring and the one side wall of the link part greater than the width of the wiper blade in the area of the link part and by the wiper blade being swivelable into the link part alongside the contact pressure spring.

20 Claims, 7 Drawing Figures

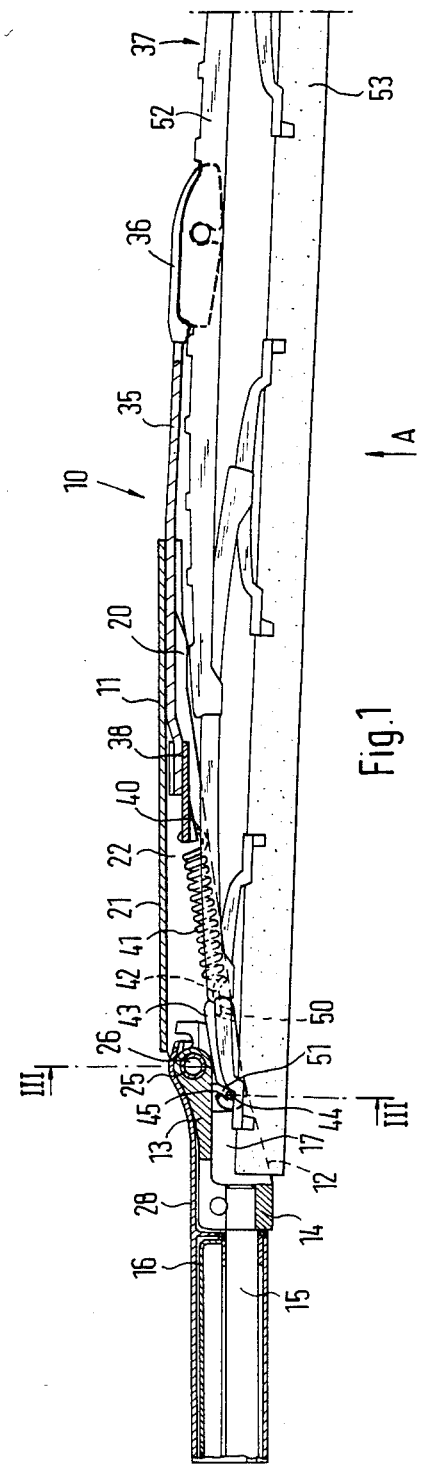
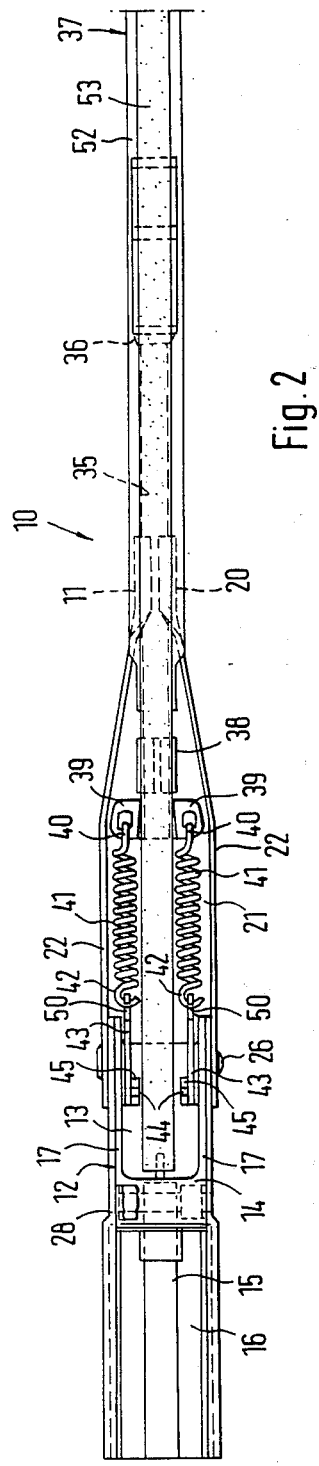

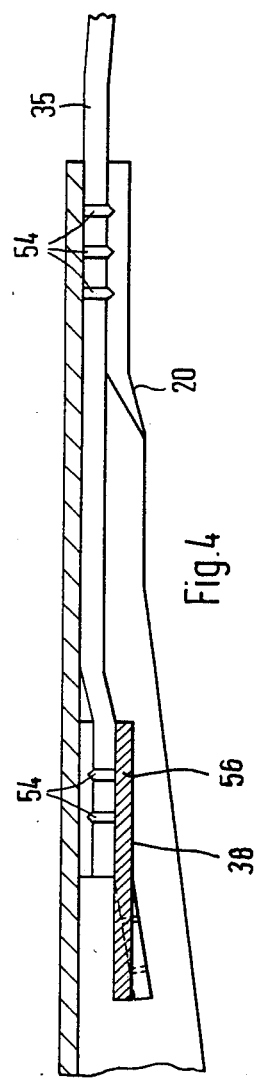
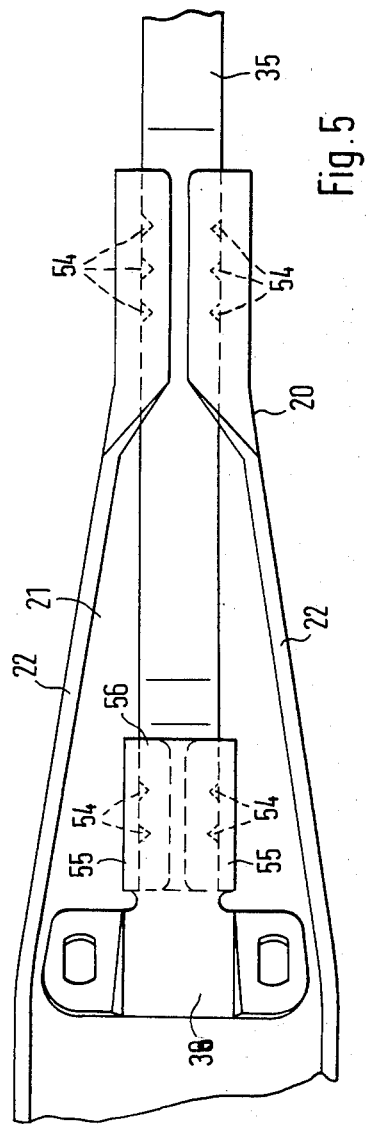
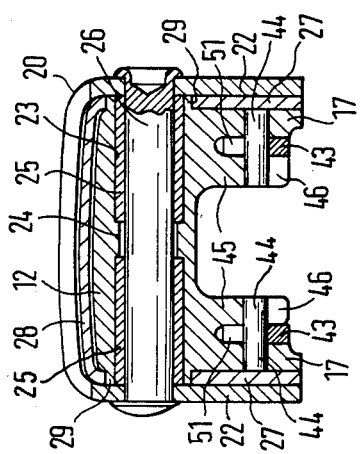

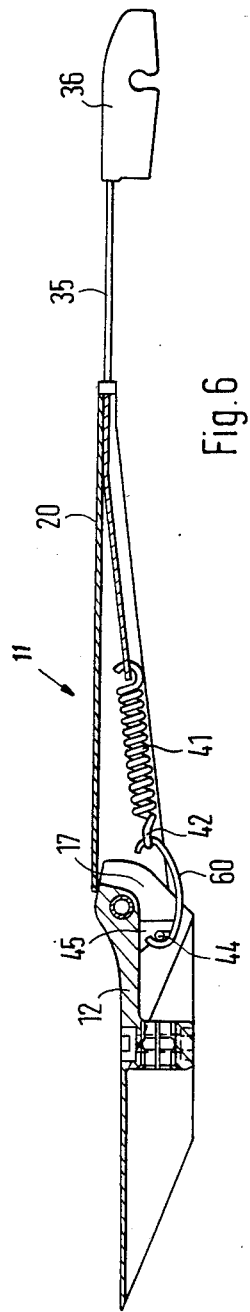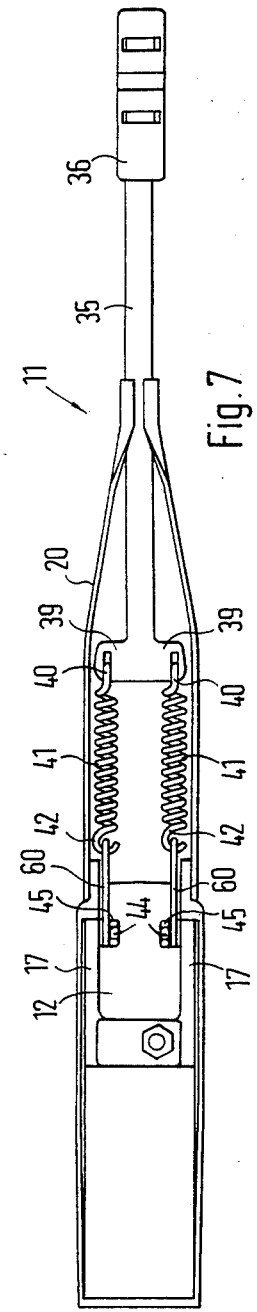

WINDSHIELD WIPER-ARM ASSEMBLY

BACKGROUND OF THE INVENTION

This invention pertains to a windshield wiper-arm assembly which is intended especially for motor vehicles.

Such a wiper-arm assembly is known from German PS No. 24 17 128 and is used therein within a single-arm windshield wiper unit. The wiper arm, like the wiper blade, is made completely straight when looked at in plan view onto the back of the link part. Furthermore, the wiper blade is in line with the wiper arm and therefore is also in line with the link part of the wiper arm. From its linking place at the free end of the wiper arm, the wiper blade extends in its one direction of extension approximately to the link between the fastening part and the link part.

One object of the invention is to provide a wiper-arm assembly having a small overall height without reducing the length of the wiper blade.

SUMMARY OF THE INVENTION

In a wiper-arm assembly in accordance with the invention, the clearance between the contact pressure spring and the one side wall of the link part is greater than the width of the wiper blade in the area of the link part and the wiper blade is swivelable into the link part alongside the contact pressure spring. A wiper-arm assembly according to the invention is therefore so constructed that the overall height already determined by the wiper arm alone is at least partly also utilized for the wiper blade. This enables the overall height of the wiper-arm assembly as a whole to be reduced without its being necessary to shorten the wiper blade.

In a preferred embodiment of the invention, the link part accommodates two contact pressure springs arranged parallel to each other and which are spaced apart from each other by a distance greater than the width of the wiper blade in the area of the link part. This makes it possible to achieve a largely symmetrically construction of the wiper-arm assembly in relation to a longitudinal median plane which is perpendicular to the back of the link part. The linking place between the fastening part and the link part is then subjected to only a small amount of strain. Each spring has to generate only half of the total contact pressure, so that springs can be chosen with a diameter which is smaller than the diameter of a single spring. The small diameter of the contact pressure springs likewise contributes to a small overall height.

Further in accordance with the invention, the wiper blade can also dip into the fastening part. The possible dipping depth is particularly great if a holding pin for the compression spring which is situated on the fastening part is arranged on one side in such a way that the wiper blade can dip into the fastening part alongside it down to its level.

It is particularly advantageous if an additional holding frame is provided for the holding pin. This holding frame primarily performs two functions. It provides support, along with a side wall of the fastening part, for the holding pin and it secures the spring hooked between it and the side wall on the holding pin from slipping off the holding pin.

In one embodiment of the invention, there are two contact pressure springs between which the wiper blade can dip. A holding pin is provided for each contact pressure spring, the two holding pins being fastened to the fastening part in a similar way and the wiper blade dips into the fastening part between them.

Further in accordance with one embodiment of the invention, the link part and with it the wiper blade may be swung away from the vehicle windshield into a stable position relative to the fastening part. The contact pressure spring is hooked to a holding pin of the fastening part via an intermediate member. This intermediate member is constructed as a stamped part standing upright when looked at from a side view and extending in the longitudinal direction of the spring. This stamped part can be narrower than a C-shaped shackle customarily used as the intermediate member, so that the holding pin can be shorter.

BRIEF DESCRIPTION OF THE DRAWINGS

The invention will be better understood from a reading of the following detailed description in conjunction with the drawings in which:

FIG. 1 is a side view of a wiper-arm assembly in which the wiper blade extends into the fastening part, the wiper arm being shown in longitudinal cross-section and the wiper blade in side view;

FIG. 2 is a view of the assembly of FIG. 1 in the direction of arrow A in FIG. 1 in which the space available for the wiper blade in the wiper arm is particularly clearly visible;

FIG. 3 is a cross-section along line III—III of FIG. 1 without the wiper blade;

FIG. 4 is a cross-sectional view of a portion of the wiper arm of FIG. 1;

FIG. 5 is a bottom view of the portion of FIG. 4;

FIG. 6 is a partial cross-sectional view of a portion of a second wiper-arm assembly with a different suspension of the contact pressure springs on the link part; and FIG. 7 is a bottom view of the wiper arm assembly portion of FIG. 6.

DETAILED DESCRIPTION

The wiper arm 11 of the wiper-arm assembly 10 shown in FIGS. 1 and 2 has a fastening part 12 with a back 13. A fastening block 14 projects from fastening part 12 at right angles. The fastening part 12 and hence the entire wiper arm 11 is fastened to a plunger 15 with fastening block 14. Plunger 15 is movably supported in its longitudinal direction in a housing 16. Because lateral walls 17 connect the fastening block 14 and the back 13 with each other the fastening part 12 has a basically U-shaped form over extensive portions.

The wiper arm 11 also includes a link part 20 which is likewise basically U-shaped over an extensive portion and has a back 21 and two side walls 22. The link part 20 is swivelably linked to the fastening part 12. The construction of the link part can be seen in greater detail in FIG. 3. Two bearing bushings 25 are inserted from opposite sides into a hole 23 as far as a stop 24. A link rivet 26 connecting the two side walls 22 of the link part 20 can turn in the bearing bushings 25. Between the side walls 22 of the link part 20 which overlap each other and the side walls 17 of the fastening part 12 are the side walls 27 of the covering cap 28 which is swivelably supported on conical projections 29 of the fastening part 12. The conical projections 29 concentrically surround the bearing bushes 25.

A wiper rod 35 which may be considered as belonging to the link part 20 is fastened to the U-profile of the link part 20. The wiper rod 35 has on its end turned away from the U-profile of the link part a connecting piece 36 with the aid of which the wiper blade 37 is linked to the wiper arm. A support 38, which has on its sides two eyelets 39, is fastened to a section of the wiper rod 35 which protrudes into the interior of the U-profile. The hook-shaped end 40 of each of two contact pressure springs 41 is hooked into each eyelet 39. The other end 42 of each contact pressure spring 41 is hooked to a holding pin 44 of the fastening part 12 via an intermediate member 43.

There is a separate holding pin 44 for each contact pressure spring 41. Each holding pin 44 is fastened in only one side wall 17 of the fastening part 12 and extends for a certain distance parallel to the link rivet 26 towards the other holding pin 44. Thus the two holding pins 44 are spaced apart. To provide support for each holding pin 44 there is allocated to each of them a holding frame 45 which is at a distance from the side wall 17 and protrudes from the back 13 of the fastening part 12 into the space between the two side walls 17. As is shown in particular by FIG. 3, the recess 46 in which the holding pins 44 in the holding frames 45 are located is open towards the side turned away from the back 13 of the fastening part 12. Each holding frame 45 can therefore be deformed in a single direction. Nevertheless, the holding pins 44 are supported against the forces of the contact pressure springs 41.

The intermediate members 43 are constructed as stamped parts standing upright in a side view according to FIG. 1 and extending in the longitudinal direction of the contact pressure spring 41. Each stamped part 43 contains a slot 50 which is open towards one longitudinal edge and a slot 51 which is open towards the other longitudinal edge. The one slot 50 runs obliquely to the end of the stamped part 43 which is near the spring, while the other slot 51 runs obliquely to the end of the stamped part which is near the fastening part. The slots 50 and 51 run so far into the stamped part 43 that the holding pins 44 and the ends 42 of the compression springs 41 lie on a center line of the stamped parts 43. The angle between the longitudinal direction of the stamped parts 43 and the longitudinal direction of the slots 50 and 51 is the same for both slots and is about 60 degrees. The stamped parts 43 can encompass the holding pins 44 between the side walls 17 and the holding frames 45, and the holding pins 44 are thus in the slots 51. The hook-shaped ends 42 of the contact pressure springs 41 are in the slots 50. When the contact pressure springs 41 are under tension, the oblique position of the slots in relation to the longitudinal direction of the stamped parts ensures that the ends 42 do not leave the slots 50 and that the holding pins 44 do not leave the slots 51 of the stamped parts 43.

As most clearly shown in FIG. 2, the clearance between the two contact pressure springs 41, between the two intermediate members 43 and between the two holding pins 44 or the two holding frames 45 is greater than the width of the wiper blade 37 in the area of the said parts. It is therefore possible, as most clearly shown in FIG. 1, for the wiper blade 37 to dip between these parts into the link part 20 and the fastening part 12. This dipping is possible both with the support frame 52 and also with the wiper rubber 53 carried on the supporting frame. This results in an extremely low overall height of the wiper-arm assembly 10.

FIGS. 4 and 5 show in greater detail how the wiper rod 35 is fastened to the U-profile and how the holder 38 is fastened to the wiper rod 35. The wiper rod 35 has a serration with the recesses 54 at its end lying within the U-profile of the link part 20 and, at a distance from this, on each of its two lateral surfaces. Firstly material of the side walls 22 of the U-profile and secondly material of the sides 55 belonging to the holder 38 is pressed into the recesses 54. As is in the case of the link part 20 by the back 21, the walls 55 of the holder 38 are also connected with each other by a back 56. On the side of the wiper rod 35 opposite to the two backs 21 and 56 respectively the walls 22 and 55 respectively are bent round once more so that the wiper rod 35 is enclosed on all four sides. The U-profile, wiper rod 35 and holder 38 are thus connected with each other in a form-locking manner in all directions.

FIGS. 6 and 7 show a wiper arm 11 which is slightly modified as compared with the wiper arm in FIGS. 1 and 2, the wiper blade shown in FIGS. 1 and 2 being likewise able to dip into the link part 20 and the fastening part 12 of the said wiper arm. Only the differences between the wiper arm in FIGS. 6 and 7 and the wiper arm in FIGS. 1 and 2 will now be discussed. The contact pressure springs 41 are in fact hooked with their ends 42 to C-shaped shackles 60 which, like the stamped parts 43, encompass the holding pins 44 between the side walls 17 of the fastening part 12 and the holding frames 45. The C-shaped shackles 60 enable the link part 20 to be turned back into a stable position in relation to the fastening part 12.

The hook-shaped ends 40 of the two contact springs 41 are again hooked into two eyelets 39 of a holder. In the example of embodiment considered, this holder is identical with the wiper rod 35, which widens at its inner end to form the two eyelets 39. While this solution does have the disadvantage that the wiper rod 35 can no longer be cut from a steel strip of the width of the greater part of the wiper rod, the number of parts and the complexity of mounting are reduced. At the outer end of the wiper rod 35 there is again fastened a connecting member 36 with the aid of which a wiper blade as shown in FIGS. 1 and 2 can be linked to the wiper arm.

What is claimed is:

1. A wiper arm assembly comprising:
    a wiper arm having a fastening part, a link part swivelably linked to said fastening part, said link part including two side walls and a back connecting said two side walls;
    a contact pressure spring carried in said link part and acting on said link and said fastening parts; and
    a wiper blade linked to said wiper arm, said wiper blade lying at least partly in a line with said link part;
    said contact pressure spring being positioned such that the clearance between said contact pressure spring and the one of said two side walls is greater than the width of said wiper blade in the area of the link part; and wherein
    said wiper blade is swivelable into said link part alongside said contact pressure spring.

2. A wiper-arm assembly in accordance with claim 1, comprising a second contact pressure spring carried in said link part and acting on said fastening part, said second contact pressure spring being arranged parallel to said contact pressure spring, the distance between said contact pressure spring and said second contact pressure spring being greater than the width of said wiper blade in the area of said link part.

3. A wiper-arm assembly in accordance with claim 1, wherein:
one end of said wiper blade extends below said fastening part; and
said fastening part includes an opening into which said wiper blade can be moved.

4. A wiper-arm assembly in accordance with claim 3, comprising a holding pin for said contact pressure spring disposed on one side of said fastening part such that said wiper blade can be moved alongside said holding pin into the fastening part.

5. A wiper-arm assembly in accordance with claim 4, wherein:
said holding pin is fastened on one side to one side wall of said two side walls and protrudes a predetermined distance into the space between said two side walls.

6. A wiper-arm assembly in accordance with claim 5, comprising:
a holding frame for said holding pin disposed at the inner end of said holding pin, said holding frame being spaced a distance from said one side wall and extending from said back into the space between said two side walls.

7. A wiper-arm assembly in accordance with claim 6, wherein said holding frame is completely deformable in a direction perpendicular to the axis of said holding pin and provides a thrust support for said holding pin substantially only in the direction of the contact pressure spring resilience.

8. A wiper-arm assembly in accordance with claim 2, wherein:
one end of said wiper blade extends below said fastening part; and
said fastening part includes an opening into which said wiper blade can be moved.

9. A wiper-arm assembly in accordance with claim 8, comprising a holding pin for said contact pressure spring disposed on one side of said fastening part such that said wiper blade can be moved alongside said holding pin into the fastening part.

10. A wiper-arm assembly in accordance with claim 9, wherein:
said holding pin is fastened on one side to one side wall of said two side walls and protrudes a predetermined distance into the space between said two side walls.

11. A wiper-arm assembly in accordance with claim 10, comprising:
a holding frame for said holding pin disposed at the inner end of said holding pin, said holding frame being spaced a distance from said one side wall and extending from said back into the space between said two side walls.

12. A wiper-arm assembly in accordance with claim 11, wherein said holding frame is completely deformable in a direction perpendicular to the axis of said holding pin and provides a thrust support for said holding pin substantially only in the direction of the contact pressure spring resilience.

13. A wiper-arm assembly in accordance with claim 8 comprising:
a first holding pin for said contact pressure spring and a second holding pin for said second contact pressure spring, said first and second holding pins each fastened in an identical manner to said fastening part and disposed such that said wiper blade can move between said first and second holding pins into said fastening part.

14. A wiper-arm assembly in accordance with claim 1, comprising:
a holding pin coupled to said fastening part; and
an intermediate member for coupling said contact pressure spring to said holding pin;
said intermediate member being a stamped part extending in the longitudinal direction of said contact pressure spring and standing upright viewed from the side.

15. A wiper-arm assembly in accordance with claim 14, wherein:
said stamped part has two slots each open towards a longitudinal edge, said holding pin engaging one of two slots, and an end of said contact pressure spring engaging the other of said two slots the angle between the longitudinal direction of each of said slots and the longitudinal direction of the stamped part being smaller than 90 degrees, said one slot running obliquely in relation to the end of said stamped part which is near to the fastening part and said other slot running obliquely to the end of said stamped art which is near to said spring, so that said holding pin and said spring end are each pressed by the spring tension against the closed ends of said slots.

16. A wiper-arm assembly in accordance with claim 15, wherein:
said two slots are open towards opposite longitudinal edges.

17. A wiper-arm assembly in accordance with claim 15, wherein:
the angle characterizing the obliqueness of each of said two slots is the same, both said two slots being of equal length and extending far enough for said holding pin and said end of said contact pressure spring to lie on a center line of said stamped part.

18. A wiper-arm assembly in accordance with claim 15, wherein said angle is approximately 60 degrees.

19. A wiper-arm assembly in accordance with claim 2, comprising:
a separate holder for coupling said contact pressure spring and said second contact pressure spring to said link part;
said holder being connected with said link part with the aid of a serration on a moulded core of one of said holder or said link part and by walls of the other of said holder or link part which lie against said moulded core and which are pressed into the recesses of said serration.

20. A wiper-arm assembly in accordance with claim 14, wherein said moulded core is integrally formed with said holder as a single piece, and said walls are sections of said two side walls.

* * * * *